(No Model.)
G. F. SIMONDS.
BALL BEARING.
No. 449,958. Patented Apr. 7, 1891.
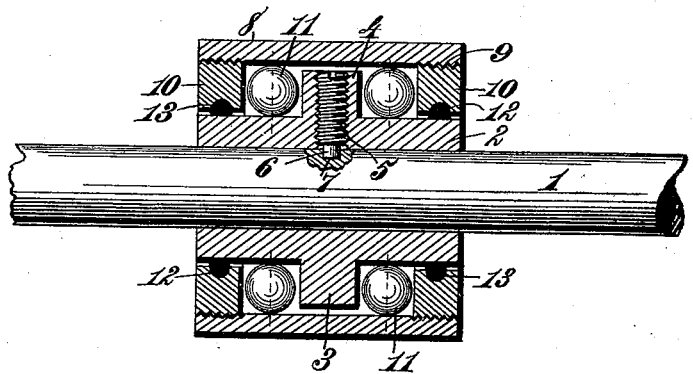
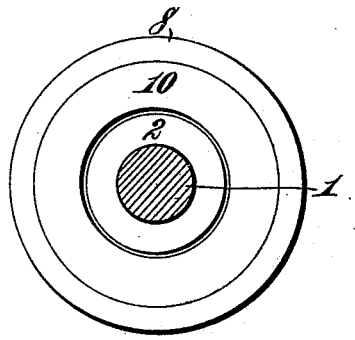
Witnesses.
Robert Everett,
Geo. W. Rea,
Inventor:
George F. Simonds.
By James L. Norris.
Atty.

UNITED STATES PATENT OFFICE.

GEORGE F. SIMONDS, OF FITCHBURG, MASSACHUSETTS.

BALL-BEARING.

SPECIFICATION forming part of Letters Patent No. 449,958, dated April 7, 1891.

Application filed October 13, 1890. Serial No. 367,994. (No model.)

*To all whom it may concern:*

Be it known that I, GEORGE F. SIMONDS, a citizen of the United States, residing at Fitchburg, in the county of Worcester and State of Massachusetts, have invented new and useful Improvements in Ball-Bearings, of which the following is a specification.

This invention relates to bearings of that class or character in which annular sets of spherical rollers or balls are employed to diminish friction and to sustain or support radial pressure or weight, as in the case of wheels or loose pulleys supported on a shaft in various mechanical appliances.

The objects of my present invention are to provide a novel, durable, and efficient ball-bearing comprising a device complete in itself for application to a through-shaft, and so constructed and arranged with relation to its several parts that dust, dirt, and other foreign matter, whether solid or fluid, will be effectually excluded from both ends of said bearing.

In order to accomplish these objects my said invention consists in the novel features of construction, the combination or arrangement of parts, and the principles of operation hereinafter described and claimed, reference being had to the annexed drawings, in which—

Figure 1 is a longitudinal central sectional view of a ball-bearing embodying my improvements. Fig. 2 is an end view of the same.

In order to enable those skilled in the art to make and use my invention, I will now describe the same in detail and with reference to the drawings, wherein—

The numeral 1 designates a shaft, on which is fixed a tubular piece or sleeve 2, having a circumferential annular rib or collar 3 intermediate its ends. The side walls of the rib or collar 3 are parallel with each other and at right angles to the shaft 1 and to the exterior of the sleeve or tubular piece 2 therein. At a suitable point in the periphery of the annular rib or collar 3 is a screw-threaded orifice 4 to receive a screw-threaded plug or bolt 5, having its inner end portion 6 plane or smooth and adapted to enter a recess 7 in the shaft 1 in such a manner as to connect the said shaft and sleeve, so that they may be rotated together. A flangeless tubular piece or outer sleeve 8, provided internally at each end with screw-threads 9, is arranged to form the outer portion or casing of the bearing, which casing is completed by externally-threaded rings 10, engaged with the screw-threads of said outer sleeve.

Between the parallel side walls of the annular rib 3 and the end rings 10 are inserted annular sets of spherical rollers or balls 11, that are arranged to sustain or support the radial pressure of a pulley and its shaft or other similar parts to which the invention may be applied, while the annular rib 3 and end rings 10 serve to separate the annular sets of spherical rollers or balls 11 and retain them in proper position.

The internal surfaces of the end rings 10, opposite the periphery of the inner sleeve 2, are provided with annular grooves 12 for receiving packing-rings 13 of any suitable material, and said packing-rings are adapted to bear against the sleeve 2 in such a manner as to effectually exclude the entrance of dust, dirt, moisture, or other extraneous matter that might impair the efficiency of the ball-bearing. The spherical rollers or balls 11 have no pressure-supporting contact with the parallel side walls of the rib or collar 3 and rings 10, but bear against the concentric surfaces formed by the periphery of the inner sleeve 2 and the interior of the outer sleeve 8, and thereby resist radial pressure or weight. The circumferential rib 3 separates the annular sets of spherical rollers or balls 11 and the screw-rings 10 and packing-rings 13 close the ends of the bearing and prevent the access of foreign matter to the interior. By this construction is provided a simple and effective ball-bearing complete in all its parts for ready application to and removal from a through-shaft and embodying also an efficient means for excluding dust, dirt, and moisture.

Although the invention is particularly adapted for application to pulleys, it is obvious that it is capable of successful and convenient use in many other appliances.

What I claim as my invention is—

A ball-bearing for a through-shaft, consisting of an inner sleeve or tubular piece having on its periphery an annular rib, collar, or projection provided with a screw-orifice, a screw plug or bolt inserted in said orifice to engage a shaft on which said sleeve is mounted, a flangeless outer sleeve or tubular piece internally screw-threaded at each end, screw-rings engaged in the ends of said outer sleeve, packing-rings bearing against and between the inner surfaces of said rings and the periphery of the inner sleeve, and spherical rollers or balls located between and bearing against the concentric surfaces of the said inner and outer sleeves and retained in place by the parallel surfaces of the collar and rings at right angles to said concentric surfaces, substantially as shown and described.

In testimony whereof I have affixed my signature in presence of two witnesses.

GEO. F. SIMONDS.

Witnesses:
 EWELL A. DICK,
 JAMES A. RUTHERFORD.